United States Patent
Kari et al.

(10) Patent No.: US 6,636,491 B1
(45) Date of Patent: Oct. 21, 2003

(54) ACCESS CONTROL METHOD FOR A MOBILE COMMUNICATIONS SYSTEM

(75) Inventors: Hannu Kari, Veikkola (FI); Mikko Puuskari, Helsinki (FI); Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/367,921

(22) PCT Filed: Jan. 11, 1999

(86) PCT No.: PCT/FI99/00012

§ 371 (c)(1), (2), (4) Date: Oct. 22, 1999

(87) PCT Pub. No.: WO99/37103

PCT Pub. Date: Jul. 22, 1999

(30) Foreign Application Priority Data

Jan. 14, 1998 (FI) .................................................. 980062

(51) Int. Cl.⁷ .................................................. H04Q 7/00
(52) U.S. Cl. ...................................... 370/328; 455/445
(58) Field of Search ................................ 455/445, 462, 455/352–56, 230; 370/328, 338, 401

(56) References Cited

U.S. PATENT DOCUMENTS

| | | | |
|---|---|---|---|
| 5,590,133 A | * 12/1996 | Billstrom et al. | 370/349 |
| 5,666,348 A | 9/1997 | Thornberg et al. | |
| 5,923,649 A | * 7/1999 | Raith | 370/328 |
| 6,104,929 A | * 8/2000 | Josse et al. | 370/465 |
| 6,246,688 B1 | * 6/2001 | Angwin et al. | 370/401 |
| 6,360,264 B1 | * 3/2002 | Rom | 709/227 |
| 6,389,008 B1 | * 5/2002 | Lupien et al. | 370/352 |
| 6,396,828 B1 | * 5/2002 | Liu | 370/352 |
| 6,466,552 B1 | * 10/2002 | Haumont | 370/310 |
| 6,480,485 B1 | * 11/2002 | Kari et al. | 370/352 |

FOREIGN PATENT DOCUMENTS

| | | |
|---|---|---|
| WO | WO 95/16330 | 6/1995 |
| WO | WO 97/11570 | 3/1997 |
| WO | WO 97/26764 | 7/1997 |
| WO | WO 97/48208 | 12/1997 |

OTHER PUBLICATIONS

"The GSM System for Mobile Communications", M. Mouly and M. Pautet, Palaiseau, France, 1992, ISBN:2–957190–07–7.

* cited by examiner

*Primary Examiner*—Chau Nguyen
*Assistant Examiner*—Keith M. George
(74) *Attorney, Agent, or Firm*—Squire, Sanders & Dempsey LLP

(57) ABSTRACT

An access point (GGSN) from a mobile communications system to an external system is selected (3) at a service node (SGSN) of the mobile communications system based on at least two or three grounds of selection: the subscription data of a mobile subscriber stored in the mobile communication system or an access point selection data given by a user in a service request (1), or on other grounds. The serving node sends to the access point (GGSN) selected a further service request (4) which includes indication of the grounds of the selection, i.e. whether the access point is selected by subscription, by a user, or based on any other grounds. Thereby the access point is able to distinguish and accept service requests in which the rights of the user are already assured by the subscription, without any security problems. When the request is based on the selection of the access point by the user, or on any other insecure grounds, the access point is able to make any further actions to ensure the security. These further actions may include rejection of the service request.

22 Claims, 1 Drawing Sheet

ACCESS CONTROL METHOD FOR A MOBILE COMMUNICATIONS SYSTEM

FIELD OF THE INVENTION

Figure 1:
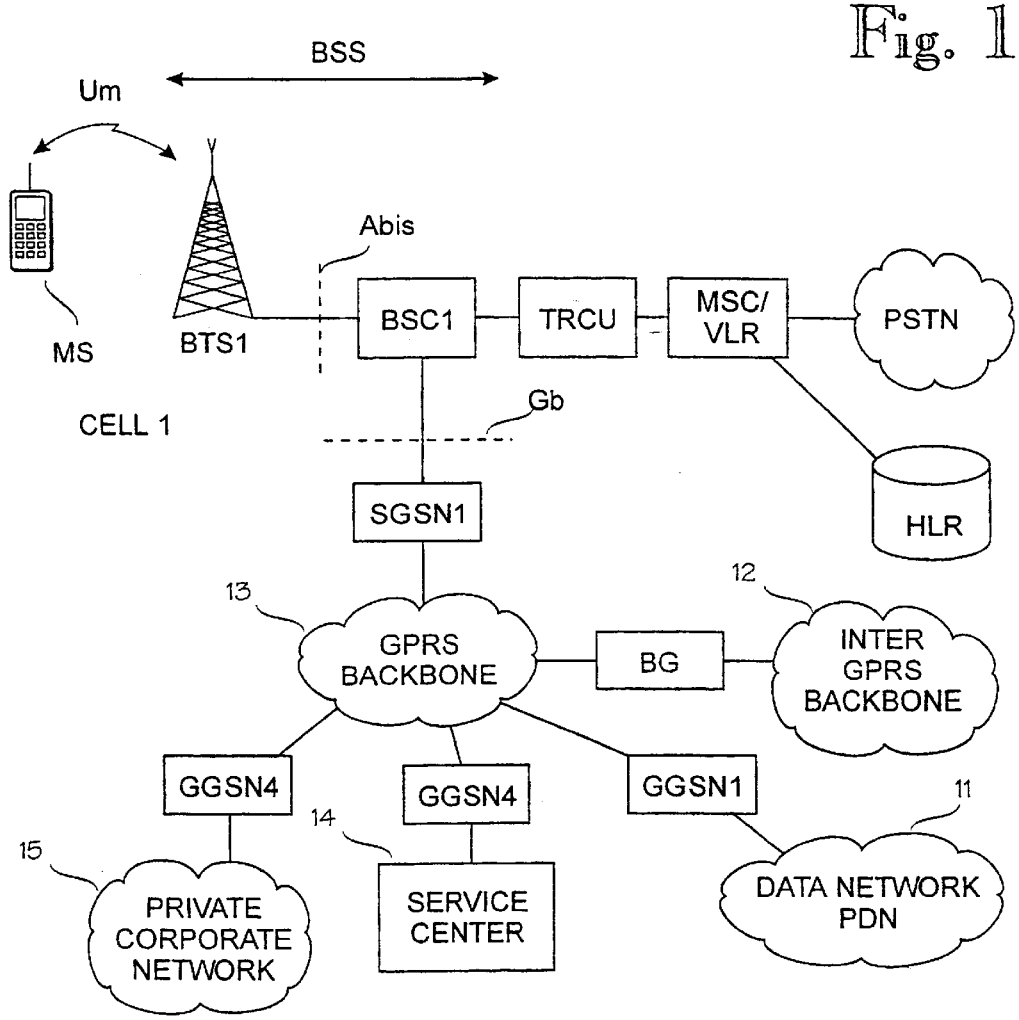

The invention relates to controlling the user access to an other system through a mobile communications network.

BACKGROUND OF THE INVENTION

Mobile communications system refers generally to any telecommunications system which enable a wireless communication when users are moving within the service area of the system. A typical mobile communications system is a Public Land Mobile Network (PLMN).

Often the mobile communications network is an access network providing a user with a wireless access to external networks, hosts, or services offered by specific service providers. The user must have a subscribership with the mobile communications system in order to be able to use the services of the mobile system. Normally, in addition to the mobile subscribership, a separate subscribership is needed with each one of the other service providers whose services are accessed through the mobile communications network. The mobile subscriber data of the user may indicate which external service the user is authorized to use and which access point or gateway node the service request should be routed. The access point or gateway node then provides further access to an external network or an external host. In this case the service request is routed in basis of a service definition in the mobile subscriber data stored by a mobile network operator, and therefore there is no need for further authentication of the user by the gateway or the service provider.

It is, however, desirable that the user is able to select the service provider or the most suitable access point of the service provider. For example, the use of the TCP/IP (Transmission Control Protocol/Internet Protocol) data network, i.e. the Internet network has increased very rapidly. Before the user can connect to the Internet, he has to have a contract with an Internet service provider ISP, who provides access to the Internet via one or more Internet access points IAP. The IAP may be a e.g. a commercial operator, university or private company. An ordinary subscriber of a conventional wired network usually needs only one IAP, the one which is closest to him, and thus has the lowest costs. A mobile subscriber may, however, roam within a large area covering one or more countries. If the mobile subscriber always uses the same IAP (home IAP) to connect to the Internet, call (data transmission) costs may increase considerably. The subscriber's Internet service provider ISP may have numerous IAPs available all around the world, and therefore it is desired that a user is able to select a nearest IAP instead of the home IAP which may be defined in the mobile subscriber data. Similar need for capability of selecting the access point by the user may be encountered also in the services other than the Internet.

The general packet radio service GPRS is a new service in the GSM system, and is one of the objects of the standardization work of the GSM phase 2+ at ETSI (European Telecommunication Standard Institute). The GPRS operational environment comprises one or more subnetwork service areas, which are interconnected by a GPRS backbone network. A subnetwork comprises a number of packet data service nodes SN, which in this application will be referred to as serving GPRS support nodes SGSN, each of which is connected to the GSM mobile communication network (typically to base station systems) in such a way that it can provide a packet service for mobile data terminals via several base stations, i.e. cells. The intermediate mobile communication network provides packet-switched data transmission between a support node and mobile data terminals. Different subnetworks are in turn connected to an external data network, e.g. to a public switched data network PSPDN, via GPRS gateway support nodes GGSN. The GPRS service thus allows to provide packet data transmission between mobile data terminals and external data networks when the GSM network functions as an access network.

In GPRS network the mobile station MS may optionally indicate, in a message requesting to activate a packet data protocol (PDP) context in the network, an access point name for selection of a reference point to a certain external network. A serving GPRS support node SGSN authenticates the mobile user and sends a PDP context creation request to a gateway node GGSN selected according to a GGSN address stored in the subscriber data or according to the access point name given by the MS, or to default GGSN known by the SGSN.

The inventors of the present invention have realized that this type of access point selection by the user may, however, create severe security problems when the mobile user is authenticated by the serving point (such as the SGSN) in the access network but not by the access point selected (such as the GGSN). The user may request any access point, although it may be authorized to use only one of the access points, and the request will be always forwarded to the access point requested. The access point receiving the request is not able to determine whether the request is allowed by subscription or selected by the user. As the access point (e.g. GGSN) may be connected directly to a private corporate network, for example, this could be a problem.

Similar security problems may arise in any mobile communications network.

An object of the present invention is a method which overcomes or alleviates the above described problems.

An aspect of the present invention is an access control method for a mobile communications system as claimed in the attached claim 1.

Another aspect of the invention is an access control arrangement for a mobile communications system as claimed in the attached claim 8.

An access point from a mobile communications system to an external system can be selected at a serving node of the mobile communications system based on at least two or three grounds of selection: the subscription data of a mobile subscriber stored in the mobile communication system or an access point selection data given by a user in a service request, or on other grounds. The other grounds may include a default access point which, according to a configuration data defined in the serving node, supports the requested protocol type A further service request is sent from the serving node to the access point selected. According to the present invention the serving node is arranged to always indicate to an access point the grounds of the selection, i.e. whether the access point is selected by subscription, by user, or based on any other grounds. Thereby the access point is able to distinguish and accept service requests in which the rights of the user are already assured by the subscription, without any security problems. When the request is based on the selection of the access point by the user, or on any other insecure grounds, the access point is able to make any further actions to ensure the security. These further actions may include rejection of the service request, a further authentication of the user, providing the external system with information that the user may be unauthorized user (which information allows further security actions by the external system), etc. The external system may be, for example, an external network, a host computer, a service center, etc.

In the preferred embodiment of the invention the mobile communications network is a packet radio network, such as GPRS.

Figure 2:
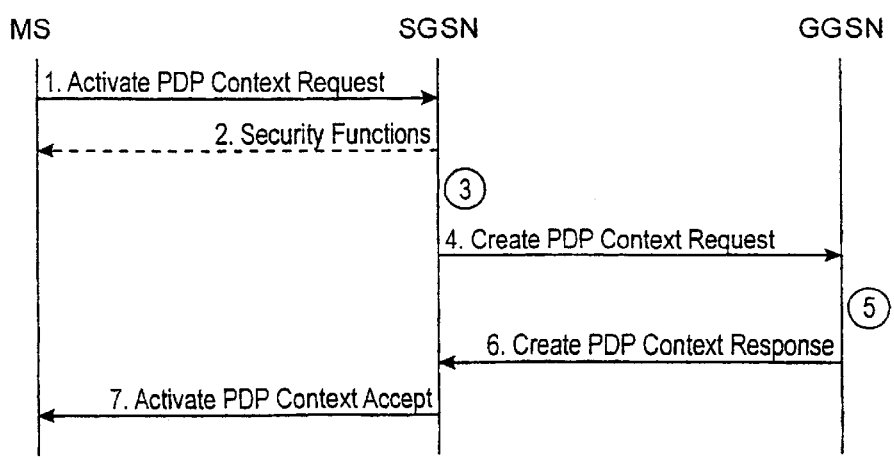

In the following, the invention will be described in greater detail by means of preferred embodiments with reference to the accompanying drawings, in which FIG. 1 illustrates GPRS network architecture, FIG. 2 illustrates a PDP Context Activation procedure according to the present invention.

The present invention can be applied to any mobile communications system in which an access point to an other system, i.e. a network or a service, provided the user can be selected according to a definition in a mobile user subscription or by an access point data given by the user, or on the grounds, such as a default selection data.

The term serving node as used herein should be understood to generally refer to any network element or functionality which carries out authentication of a mobile user and selects an access point and sends a furher service request to it. A term access point as used herein should be understood to generally refer to any network element or functionality which provides a gateway or an access to an external system. The term service request as used herein should be understood to generally refer to any message which requests to activate or setup a communication mode in the network.

The invention can be especially preferably used for providing a general packet radio service GPRS in the pan-European digital mobile communication system GSM (Global System for Mobile Communication) or in corresponding mobile communication systems, such as DCS1800 and PCS (Personal Communication System). In the following, the preferred embodiments of the invention will be described by means of a GPRS packet radio network formed by the GPRS service and the GSM system without limiting the invention to this particular packet radio system.

FIG. 1 illustrates a GPRS packet radio network implemented in the GSM system.

The basic structure of the GSM system comprises two elements: a base station system BSS and a network subsystem NSS. The BSS and mobile stations MS communicate over radio links. In the base station system BSS each cell is served by a base station BTS. A number of base stations are connected to a base station controller BSC, which controls the radio frequencies and channels used by the BTS. Base station controllers BSC are connected to a mobile services switching centre MSC. As regards a more detailed description of the GSM system, reference is made to the ETSIIGSM recommendations and *The GSM System for Mobile Communications*, M. Mouly and M. Pautet, Palaiseau, France, 1992, ISBN:2-957190-07-7.

In the figure the GPRS system connected to the GSM network comprises one GPRS network, which in turn comprises one serving GPRS support node (SGSN) and several GPRS gateway support nodes (GGSN). The different support nodes SGSN and GGSN are interconnected by an intraoperator backbone network. It is important to realize that in the GPRS network there may be any number of serving support nodes and gateway support nodes.

The serving GPRS support node SGSN is a node which serves the mobile station MS. Each support node SGSN controls a packet data service within the area of one or more cells in a cellular packet radio network, and therefore, each support node SGSN is connected (Gb interface) to a certain local element of the GSM system. This connection is typically established to the base station system BSS, i.e. to base station controllers BSC or to a base station BTS. The mobile station MS located in a cell communicates with a base station BTS over a radio interface and further with the support node SGSN to the service area of which the cell belongs through the mobile communication network. In principle, the mobile communication network between the support node SGSN and the mobile station MS only relays packets between these two. To realize this the mobile communication network provides packet-switched transmission of data packets between the mobile station MS and the serving support node SGSN. It has to be noted that the mobile communication network only provides a physical connection between the mobile station MS and the support node SGSN, and thus its exact function and structure is not significant with respect to the invention. The SGSN is also provided with a signalling interface Gs to the visitor location register VLR of the mobile communication network and/or to the mobile services switching centre, e.g. signalling connection MS7. The SGSN may transmit location information to the MSCNLR and/or receive requests for searching for a GPRS subscriber from the MSCNLR.

The GPRS gateway support nodes GGSN connect an operator's GPRS network to external systems, such as other operators' GPRS systems, data networks 11–12, such as IP network (Internet) or X.25 network, and service centers. A border gateway BG provides an access to an inter-operator GPRS backbone network. The GGSN may also be connected directly to a private corporate network or host. The GGSN includes GPRS subscribers' PDP addresses and routing information, i.e. SGSN addresses. Routing information is used for tunneling protocol data units PDU from data network 11 to the current switching point of the MS, i.e. to the serving SGSN. Functionalities of the SGSN and GGSN can be connected to the same physical node.

The home location register HLR of the GSM network contains GPRS subscriber data and routing information and maps the subscriber's IMSI into one or more pairs of the PDP type and PDP address. The HLR also maps each PDP type and PDP address pair into one or more GGSNs. The SGSN has a Gr interface to the HLR (a direct signalling connection or via an internal backbone network 13). The HLR of a roaming MS may be in a different mobile communication network than the serving SGSN.

An intra-operator backbone network 13, which interconnects an operator's SGSN and GGSN equipment can be implemented, for example, by means of a local network, such as an IP network. It should be noted that an operator's GPRS network can also be implemented without the intra-operator backbone network, e.g. by providing all features in one computer.

An inter-operator backbone network is a network via which different operators' gateway support nodes GGSN can communicate with one another. Network access is the means by which a user is connected to a telecommunication network in order to use the services and/or facilities of that network. An access protocol is a defined set of procedures that enables the user to employ the services and/or facilities of the network. The SGSN, which is at the same hierarchical level as the MSC, keeps track of the individual MSs' location and performs security functions and access control.

GPRS security functionality is equivalent to the existing GSM security. The SGSN performs authentication and cipher setting procedures based on the same algorithms, keys, and criteria as in existing GSM. GPRS uses a ciphering algorithm optimised for packet data transmission.

In order to access the GPRS services, a MS shall first make its presence known to the network by performing a GPRS attach. This operation establishes a logical link between the MS and the SGSN, and makes the MS available for SMS over GPRS, paging via SGSN, and notification of incoming GPRS data. More particularly, when the MS attaches to the GPRS network, i.e. in a GPRS attach procedure, the SGSN creates a mobility management context (MM context). Also the authentication of the user is carried out by the SGSN in the GPRS attach prosedure.

In order to send and receive GPRS data, the MS shall activate the packet data address that it wants to use, by requesting a PDP activation prosedure. This operation makes the MS known in the corresponding GGSN, and interworking with external data networks can commence. More, particularly a PDP context is created in the MS and the GGSN and the SGSN.

As a consequence, three different MM states of the MS are typical of the mobility management (MM) of a GPRS subscriber: idle state, standby state and ready state. Each state represents a spesific functionality and information level, which has been allocated to the MS and SGSN. Information sets related to these states, called MM contexts, are stored in the SGSN and MS. The context of the SGSN contains subscriber data, such as the subscriber's IMSI, TLLI and location and routing information, etc.

In the idle state the MS cannot be reached from the GPRS network, and no dynamic information on the current state or location of the MS, i.e. the MM context, is maintained in the network. Neither does the MS receive nor transmit data packets, in consequence of which no logical link has been established between the SGSN and the MS. If the MS is dual mode terminal, i.e. it can function both in the GPRS network and in the GSM network, it can be in the GSM network when functioning in the GPRS idle state. The MS can switch from the idle state to the ready state by attaching to the GPRS network, and from the standby or ready state to the idle state by detaching from the GPRS network.

In the standby and ready states the MS is attached to the GPRS network. In the GPRS network, a dynamic MM context has been created for the MS, and a logical link LLC (Logical Link Control) established between the MS and the SGSN in a protocol layer. The ready state is the actual data transmission state, in which the MS can transmit and receive user data. The MS switches from the standby state to the ready state either when the GPRS network searches for the MS or when the MS initiates data transmission or signalling. The MS may remain in the ready state (for a period set with a timer) even when no user data is transmitted nor signalling performed.

In the standby and ready states the MS may also have one or more PDP contexts (Packet Data Protocol), which are stored in the serving SGSN in connection with the MM context. The PDP context defines different data transmission parameters, such as the PDP type (e.g. X.25 or IP), PDP address (e.g. X.121 address), quality of service QoS and NSAPI (Network Service Access Point Identifier). The MS activates the PDU context with a specific message, Activate PDP Context Request, in which it gives information on the TLLI, PDP type, PDP address, required QoS and NSAPI, and optionally the access point name APN. When the MS roams to the area of a new SGSN, the new SGSN requests MM and PDP contexts from the old SGSN.

In addition to the standard point-to-point data transfer, GPRS can support anonymous access to the network. The service allows a MS to exchange data packets with a predefined host which can be addressed by the supported interworking protocols. Only a limited number of destination PDP addresses can be used within this service. IMSI or IMEI shall not be used when accessing the network thus guaranteeing a high level of anonymity. Therefore, no authentication and ciphering functionalities are foreseen for anonymous access.

As noted above, GGSN selection by the user in the PDP context activation procedure may create severe security problems when the mobile user is authenticated only by the SGSN but not by the GGSN selected. The user may request any GGSN, although it may be authorized to use only one of the GGSNs, and the request will be always forwarded to the GGSN requested. The GGSN receiving the request is not able to determine whether the request is allowed by subscription or selected by the user. As the GGSN may be connected directly to a private corporate network, for example, this could be a problem In accordance to the present invention, this problem is overcome or alleviated by that the SSGN indicates to the GGSN how the GGSN was selected.

The PDP Context Activation procedure according to the preferred embodiment of the invention will be now explained with reference to FIG. 2.

At step 1, the MS sends an Activate PDP Context Request (TLLI, PDP Type, PDP Address, QoS Requested, NSAPI, Access Point Name APN, PDP configurations options) message to the SGSN. The MS may optionally indicate an Access Point Name APN for the selection of a reference point to a certain external network. The GGSN Address is either a GGSN IP address or a logical name referring to the GGSN to be used. Further, the MS shall use PDP Address to indicate whether it requires the use of a static PDP address or whether it requires the use of a dynamic PDP address. This is due to the fact that PDP addresses can be allocated to a MS in three different ways: the Home PLMN operator assigns a PDP address permanently to the MS (static PDP address); the HPLMN operator assigns a PDP address to the MS when a PDP context is activated (dynamic HPLMN PDP address), or the VPLMN operator assigns a PDP address to the MS when a PDP context is activated (dynamic VPLMN PDP address). It is the HPLMN operator that defines in the subscription whether a dynamic HPLMN or VPLMN PDP address can be used. When dynamic addressing is used, it is the responsibility of the GGSN to allocate and release the dynamic PDP address.

At step 2, security functions may be executed.

At step 3, the SGSN checks that the MS is allowed to activate the PDP address against the subscription data which was stored in the SGSN during GPRS attach. If allowed, the SGSN creates a TID (Tunnel Identifier used by the GPRS Tunnelling protocol between GSNs to identify a PDP context) for the requested PDP context by combining the IMSI stored in the MM context with the NSAPI received from the MS. If the MS requests a dynamic address, then the SGSN lets a GGSN allocate the dynamic address. The GGSN used is the GGSN Address stored in the PDP context, or, if this field is empty, the GGSN indicated by the Access Point Name in the Activate PDP Context Request message. A suitable GGSN shall be chosen by the SGSN, if the VPLMN address is allowed in the mobile subscriber data and if there is no APN or no APN corresponding to a valid GGSN address.

At step 4, the SGSN sends a Create PDP Context Request (IMSI, APN, PDP configurations options, PDP Type, PDP Address, QoS Negotiated, TID) message to the affected GGSN. PDP Address is set to zero if a dynamic address is requested. Further, in accordance with the present invention, the SGSN indicates in the Create PDP Context Request message how the GGSN was chosen. In the preferred embodiment of the invention the Create PDP Context Request message is provided with a new information unit Selection mode having three values, namely APN, Subscription, and SGSN, indicating whether the GGSN was chosen based on the subscription or based on the Access Point Name given by the MS, or whether the GGSN was chosen by the SGSN, respectively.

At step 5, the GGSN checks the value of the Selection mode in the request message. If the value of the Selection mode is Subscription, the GGSN knows that it was chosen based on the subscriber data stored in the SGSN, and therefore, the mobile user most likely has a right to use the spesific GGSN. In that case the GGSN accepts the request and creates a new entry in its PDP context table. The new entry allows the GGSN to route PDP PDUs between the SGSN and the external PDP network. If the value of the Selection mode is Access Point Name, the GGSN knows that it was chosen based on the Access point name given by the user, and therefore there is a risk that the user is not authorized to use the specific GGSN. In that case, according to one embodiment of the invention, the GGSN rejects the request and does not create a PDP context. Alternatively, the GGSN may, however, make any action to ensure the security, such as a further authentication of the user, or providing the external system with information that the user may be unauthorized user (which information allows further security actions by the external system), etc. If the value of the Selection mode is SGSN, the GGSN proceeds as in case of value Access Point Name, depending on its configuration, even if the most likely case is that the normal use is suspected and the GGSN can establish the context. However, if less strict security is allowed, the GGSN may also proceed as in case of value Subscription.

At step 6, the GGSN then returns a Create PDP Context Response (TID, PDP configuration options, PDP Address, BB Protocol, Cause) message to the SGSN over the GPRS backbone network. The Cause value indicates if a PDP context has been created in the GGSN or not. The Cause value 'Request Accepted' indicates that a PDP context has been created in the GGSN. A PDP context has not been created in the GGSN, i.e. the request is rejected, if the Cause differs from 'Request accepted'. PDP Address is included if the GGSN allocated a PDP address. BB Protocol indicates whether TCP or UDP shall be used to transport user data on the backbone network between the SGSN and GGSN.

At step 7, upon receiving a Create PDP Context Response with a Cause "Request accepted", the SGSN inserts the NSAPI along with the GGSN address in its PDP context. If the MS has requested a dynamic address, the PDP address received from the GGSN is inserted in the PDP context. The SGSN returns an Activate PDP Context Accept (TLLI, PDP Type, PDP Address, NSAPI, QoS Negotiated) message to the MS. The SGSN is now able to route PDP PDUs between the GGSN and the MS.

If the PDP context activation procedure fails, e.g the GGSN returns a Create PDP Context Response with Cause which rejects the Create PDP Context Request, the SGSN returns an Activate PDP Context Reject (Cause) message. The MS may then attempt another activation to the same PDP address up to a maximum number of attempts.

A more sophisticated GGSN selection algorithm which may be used at step 3 in the PDP context creation algorithm above will be now described. This improved GGSN selection algorithm is arranged to better take account the configurations in a subscriber data made by the home operator of the mobile subscriber. The improved selection-algorithm follows the following basic principles:

1. If home operator has configured for a MS a static address, then the GGSN stored in the mobile subscriber data shall be used always when this address is required.

2. If an MS requests a non-subscribed address (not defined in the mobile subscriber data), the SGSN shall reject the request.

3. If a dynamic address is not allowed according to the mobile subscriber data, and if only one address is defined in the mobile subscriber data for the requested PDP type, even if the MS requests a dynamic address or an empty PDP address, the SGSN selects the address defined in the mobile subscriber data.

4. If home operator has allowed for a MS a dynamic address, but a VPLMN address is not allowed, then a GGSN stored in the mobile subscriber data for this PDP type s always used.

5. If home operator has allowed for a MS a dynamic address and the VPLMN address is allowed, and the MS has defined the GGSN by a Access Point Name APN in the PDP context activation, then the GGSN defined by the APN sent by the MS is used.

6. If home operator has allowed for a MS a dynamic address and the VPLMN address is allowed and the MS has not defined the GGSN by a Access Point Name in the PDP context activation, but the VPLMN supports the requested protocol (PDP type) (i.e. SGSN knows a GGSN that supports the request protocol), then SGSN selects the supporting GGSN 7. If home operator has allowed for a MS a dynamic address and the VPLMN address is allowed and the MS has not defined the GGSN by a Access Point Name in the PDP context activation and the VPLMN does not support the protocol, then the GGSN that is indicated in the mobile subscriber data for this PDP type shall be used.

8. When a dynamic address is requested and the SGSN uses the GGSN defined in the mobile subscriber data, then SGSN will check whether there is only a single GGSN defined for this PDP type or none or many GGSNs defined for this PDP type. If there is only one GGSN defined for this PDP type, the SGSN will use this GGSN. If there are many GGSNs defined for this PDP type, the SGSN will select one of the GGSNs. If there is no GGSN defined for this PDP type, the SGSN will reject the request.

A detailed GGSN algorithm according to one embodiment of the invention meeting the above principles is described in the following. In the Activate PDP context request the parameters include the PDP type (mandatory), the PDP address (optional, empty address means that a dynamic address is requested), the APN (Access Point Name (optional). In the Create PDP context request message sent by the SGSN to the GGSN the parameters include :PDP type: mandatory, POP address: optional, APN: optional.

Firstly, the SGSN receives a Activate PDP Context message from the MS. Then the SGSN checks the PDP address field and APN field in the received Activate PDP Context message.

1.) If the PDP address field is empty and the APN field is empty, then check whether a dynamic address is allowed according to the subscriber data.
- 1.1.1) If the dynamic address is allowed, then check whether VPLMN address is allowed to the user according to the subscriber data.
  - 1.1.1.1) If VPLMN address is allowed, then check whether there is a default GGSN (configured in the SGSN) supporting the PDP type indicated by the MS available.
- 1.1.1) If the default GGSN is available, use it and send to the selected GGSN a Create PDP Context Request in which the PDP address field and the APN fields are empty.
  - 1.1.1.2) If no default GGSN address is available for this PDP type, then check if there is a GGSN address defined for this PDP type in the subscriber data of the mobile subscriber.
    - 1.1.1.2.1) If there is a GGSN address defined for a dynamic address for this PDP type or if there is a single GGSN address for this PDP type, use this GGSN address and send to this GGSN a Create PDP Context Request in which the PDP address field and the APN fields are empty.
    - 1.1.1.2.2) If there is no GGSN address defined for a dynamic address for this PDP type or if there is no or many GGSN address(es) for this PDP type, reject the request to activate the PDP context.
- 1.1.2) If the VPLMN address is not allowed, then check whether there is a GGSN address for this PDP type in the mobile subscriber data.
  - 1.1.2.1) If there is a GGSN address for this PDP type in the mobile subscriber data or if there is there is a single GGSN address for this PDP type, use this GGSN address and send to this GGSN a Create PDP Context Request in which the PDP address field and the APN fields are empty.
  - 1.1.2.2) If there is no GGSN address defined for a dynamic address for this PDP type or if there is no or many GGSN address(es) for this PDP type, reject the request to activate the PDP context.
- 1.2) If the dynamic address is not allowed, then check whether there is a single GGSN address for this PDP type in the mobile subscriber data.
  - 1.2.1) If there is a GGSN address for this PDP type in the mobile subscriber data, use this GGSN address and send to this GGSN a Create PDP Context Request which includes a PDP address obtained from the mobile subscriber data and in which the APN field is empty.
  - 1.2.2) If there is no GGSN address defined for this PDP type, reject the request to activate the PDP context.

2) If the PDP address field is occupied and the APN field empty in the received Activate PDP Context message, compare the PDP address sent by the MS with the PDP address(es) obtained from the mobile subscriber data.
- 2.1) If any of the PDP addresses in the subscriber data do match, then send a Create PDP Context Request which includes this matching PDP address to a corresponding GGSN address obtained from the mobile subscriber data.
- 2.2.) If any of the PDP addresses in the subscriber data do not match, reject the request to activate the PDP context.

3) If the PDP address field is empty and the APN field is not empty in the received Activate PDP Context message, then check whether a dynamic address is allowed.
- 3.1) If the dynamic address is not allowed, check whether there is a single GGSN address defined for this PDP type in the mobile subscriber data.
  - 3.1.1) If there is a single GGSN address for this PDP type in the subscriber data, then use this GGSN address and send to the selected GGSN a Create PDP Context Request which includes a PDP address obtained from the subscriber data and the APN obtained from the user.
  - 3.1.2) If there is not a single GGSN address for this PDP type in the subscriber data, reject the request to activate the PDP context.
- 3.2) If he dynamic address is allowed, then check whether a VPLMN address is allowed.
  - 3.2.1) If the VPLMN address is allowed, then try to convert the APN into the GGSN IP address (e.g., using DNS server)
    - 3.2.1.1) If you can convert the APN, then send to this GGSN the Create PDP Context Request including the APN.
    - 3.2.1.2) If you cannot convert the APN, then check whether there is a default GGSN (configured in SGSN, not from mobile subscriber data) supporting the requested PDP type sent by MS.
      - 3.2.1.2.1) if there is a default GGSN, then use it.
      - 3.2.1.2.2) If there is no default GGSN available for this PDP type, then check if there is a GGSN address for this PDP type defined in the mobile subscriber data.
        - 3.2.1.2.2.1) If there is a GGSN address defined for dynamic address for this PDP type or if there is a single GGSN address for this PDP type, then send to this GGSN the Create PDP Context Request including the APN.
        - 3.2.1.2.1.2) If there is no GGSN address defined for a dynamic address for this PDP type or if there is no or many GGSN address(es) for this PDP type, reject the request to activate the PDP context.
  - 3.2.2) If VPLMN address is not allowed, then check if there is a GGSN address for this PDP type defined in the mobile subscriber data.
    - 3.2.1.1) If there is a GGSN address defined for dynamic address for this PDP type or if there is a single GGSN address for this PDP type, then send to this GGSN the Create PDP Context Request with an empty PDP address and the APN field sent by MS.
    - 3.2.1.2) If there is no GGSN address defined for a dynamic address for this PDP type or if there is no or many GGSN address(es) for this PDP type, reject the request to activate the PDP context.

4) if the PDP address field is full and the APN field is not empty in the received Activate PDP Context message, check whether the received PDP address equals to one of the PDP addresses defined for this PDP type in the mobile subscriber data.
- 4.1) If one of the PDP addresses do match, then use the PDP and GGSN addresses obtained from the mobile subscriber data and the Create PDP Context Request containing the PDP address and the APN.
- 4.2) If none of the PDP addresses do match, then reject the request to activate the PDP context.

A detailed selection GGSN algorithm according to another embodiment of the invention meeting the above principles is described in the following. This second algorithm is identical with the above described first algorithm in steps 1 to 3.1.2 and in steps 4 to 4.2. The remaining steps are as follows:
- 3.2.) If a dynamic address is allowed, then derive the GGSN address from the APN.
  - 3.2.1) If the GGSN address is in the HPLMN, then use it and send a Create PDP Context Request including the APN.

3.2.2) If the GGSN address is in the VPLMN, then check whether a VPLMN address is allowed.
   3.2.2.1) If a VPLMN address is allowed, then use it and send a Create PDP Context Request including the APN.
   3.2.2.2) If a VPLMN address is not allowed, then check whether there is a GGSN address for this PDP type defined in the mobile subscriber data.
      3.2.2.2.1) If there is a GGSN address defined for dynamic address for this PDP type or if there is a single GGSN address for this PDP type, then send to this GGSN the Create PDP Context Request with an empty PDP address and the APN field sent by MS.
      3.2.2.2.2) If there is no GGSN address defined for a dynamic address for this PDP type or if there is no or many GGSN address(es) for this PDP type, reject the request to activate the PDP context.

It should be noted that in step 1.1.2 it seems useful to define a default GGSN for a dynamic address. In the HLR, it will be a normal context with an empty PDP address. If there is a single GGSN for this PDP type, it could be understood, that this GGSN should be used also for a dynamic address. It may be surprising to use a dynamic address if you have a static address allocated in the same GGSN, but the static address might have a processing intensive screening.

It should be further noted that the basic idea in steps 3.2 to 3.2.1 of the first embodiment is that if a VPLMN address is not allowed, then it is not possible to use a GGSN not subscribed. The reason is that if you are roaming, how the visited SGSN will know if the IP address of the GGSN is in the Home network. It could be in a third PLMN. The way to know it would be that each SGSN in the world knows the IP subnetwork of each operator. If the IMSI includes network codes and country codes, one solution the IP subnetwork of each operator should be a country code.network code.xxx.zzz. In this embodiment the VPLMN allowed parameter could be renamed as a nonsubscribed GGSN allowed. This embodiment allows the operator to use dynamic address (in order to save address space) but also use a fixed GGSN (eg, the corporate GGSN with specific screening profile) while using APN for external network. Otherwise the user could change the APN and use other GGSN than its corporate.

It should be further noted that in step 4.1.2 it is considered that if a non subscribe address is requested, the request should be rejected. But if an address has to be negotiated (as it is common in the IP world), it can still be part of PDP configurations options which are transparent to the SGSN.

Similar modifications as described with reference to FIG. 2 may be made in an Anonymous Access PDP Context activation procedure of the GPRS. More particularly, the SGSN is arranged to indicate in the Create PDP Context Request message how the GGSN was chosen. In the preferred embodiment of the invention the Create PDP Context Request message is provided with a new information unit Selection mode having three values, namely APN, Subscription, and SGSN, indicating whether the GGSN was chosen based on the subscription or based on the Access Point Name given by the MS, or whether the GGSN was chosen by the SGSN, respectively. Further, the GGSN is arranged to check the value of the Selection mode in the request message. If the value of the Selection mode is Subscription, the GGSN accepts the request and creates a new entry in its PDP context table. If the value of the Selection mode is Access Point Name or SGSN, the GGSN rejects the request and does not create a PDP context, or alternatively performs any other action to ensure the security.

The present invention can be applied also to control the requests of the users to join a Point-to-Multipoint user group. The point-to-multipoint Group call (PTM.G) service is used in the GPRS to deliver information from a single point, such as a service center, to a group of users. The service may be open for all user, i.e. the group is open, or the service may be restricted to specific users, i.e. the group is closed. Typical applications are delivery of news and traffic information. The access point is now the PTM service center, for example. The mobile subscriber data stored in the SGSN contain information about subscription to a PTM Group. In a request sent to the PTM service center the SGSN indicates whether the service center was chosen based on the subscriber data or based on an access point data given by the MS. The service center will check the group status and if the group is open, accept all requests, and if the group is closed, accept only the requests having indication that the service center was selected based on subscriber data.

Similarly the present invention can be applied in any mobile communications network. An operator of an external system or a service provider may have agreement with the mobile network operator that the mobile network operator stores information on the subscription to the external system or service in the mobile subscriber data. The serving network element or function in the mobile network shall, in accordance the principles of the present invention, indicate to the service provider or operator whether the service request is based on a subscription or not. A potential mobile networks in which the principles of the present invention may be applied are the third generation mobile communications systems, such as the Universal Mobile Communications System (UMTS) and the Future Public Mobile Telecommunication System (FPLMTS), or IMT-2000.

The description only illustrates preferred embodiments of the invention. The invention is not, however, limited to these examples, but it may vary within the scope and spirit of the appended claims.

What is claimed is:

1. An access control method for a mobile communications system, comprising steps of
   sending an access request from a mobile subscriber unit of a mobile subscriber to a serving support node over an air interface,
   selecting at said serving support node an access point to an external system on the grounds of the subscription data of the mobile subscriber or on grounds of an access point data possibly given in said access request or on other grounds,
   sending from said serving support node to said selected access point a request to create a transmission context for communication between the mobile subscriber unit and the selected access point,
   indicating in said transmission context request the grounds of the selection of the access point.

2. A method according to claim 1 in a packet radio system, comprising
   sending a packet data protocol (PDP) context activation request from a mobile subscriber unit of a mobile subscriber to a serving packet radio support node over an air interface,
   selecting at said serving packet radio support node a gateway packet radio support node providing an access to an external system, on the grounds of the subscription data of the mobile subscriber or on the grounds of an access point data possibly given in said service PDP context activation request or on other grounds, sending from said serving packet radio support node to said selected gateway packet radio support node a request to create a PDP context for communication between the mobile subscriber unit and the selected gateway packet radio support node, indicating in said create PDP context request the grounds of selection of the access node.

3. Method according to claim 2, wherein the packet radio network comprises a general packet radio service GPRS.

4. An access control method for a mobile communications system, comprising sending an access request from a mobile subscriber unit of a mobile subscriber to a serving support node over an air interface, selecting at said serving support node an access point to an external system on the grounds of the subscription data of the mobile subscriber or on grounds of an access point data possibly given in said access request or on other grounds, sending from said serving support node to said selected access point a request to create a transmission context for communication between the mobile subscriber unit and the selected access point, indicating in said transmission context request the grounds of the selection of the access point, and rejecting at said access point the transmission context request if the grounds of the access point selection is an access point data given in said service request message.

5. An access control method for a mobile communications system, comprising sending an access request from a mobile subscriber unit of a mobile subscriber to a serving support node over an air interface, selecting at said serving support node an access point to an external system on the grounds of the subscription data of the mobile subscriber or on grounds of an access point data possibly given in said access request or on other grounds, sending from said serving support node to said selected access point a request to create a transmission context for communication between the mobile subscriber unit and the selected access point, indicating in said transmission context request the grounds of the selection of the access point, and rejecting at said access point the transmission context request if the grounds of the access point selection is other than the subscription data of the mobile subscriber.

6. An access control method for a mobile communications systems, comprising sending an access request from a mobile subscriber unit of a mobile subscriber to a serving support node over an air interface, selecting at said serving support node an access point to an external system on the grounds of the subscription data of the mobile subscriber or on grounds of an access point data possibly given in said access request or on other grounds, sending from said serving support node to said selected access point a request to create a transmission context for communication between the mobile subscriber unit and the selected access point, indicating in said transmission context request the grounds of the selection of the access point, and performing a further security action, at said access point if the grounds of the access point selection is an access point data given in said access request message.

7. A method according to claim 6, wherein said further security action comprises a further authentication of the user at said access.

8. An access control method for a mobile communications system, comprising sending an access request from a mobile subscriber unit of a mobile subscriber to a serving support node over an air interface, selecting at said serving support node an access point to an external system on the grounds of the subscription data of the mobile subscriber or on grounds of an access point data possibly given in said access request or on other grounds, sending from said serving support node to said selected access point a request to create a transmission context for communication between the mobile subscriber unit and the selected access point, indicating in said transmission context request the grounds of the selection of the access point, and performing a further security action, at said access point if the grounds of the access point selection is other than the subscription data of the mobile subscriber.

9. A method according to claim 8, wherein said further security action comprises a further authentication of the user at said access.

10. A mobile communications system, comprising mobile subscriber units, serving network elements and access points to external systems, each of the serving network elements being configured to be responsive to an access request received from a mobile subscriber unit of a mobile subscriber over an air interface for selecting one of said access points on the grounds of the subscription data of the mobile subscriber or on the grounds of an access point data possibly given in said access request or on other grounds, and each of the serving network elements being further configured to send to said selected access point a request to create a transmission context for communication between the mobile subscriber unit and the selected access point, each of said serving network elements being further configured to indicate the grounds of the selection of the access point in said transmission context request.

11. A system according to claim 10, wherein the selected access point is configured to reject the transmission context request in response to the grounds of the access point selection being an access point data given in said service request message.

12. A system according to claim 10, wherein the selected access point is configured to reject the transmission context request in response to the grounds of the access point selection being other than the subscription data of the mobile subscriber.

13. A system according to claim 10, wherein the selected access point is configured to perform a further security action, request in response to the grounds of the access point selection being an access point data given in said service request message.

14. A system according to claim 13, wherein said further security action comprises a further authentication of the user at said access.

15. A system according to claim 10, wherein the selected access point is configured to perform a further security action, request in response to the grounds of the access point selection being other than the subscription data of the mobile subscriber.

16. A system according to claim 15, wherein said further security action comprises a further authentication of the user at said access.

17. A system according to claim 10, wherein said mobile communications system is a packet radio system.

18. A system according to claim 17, wherein the serving support node is a serving packet radio support node and the access points comprise gateway packet radio support nodes, and that the access request is a packet data protocol (PDP) context activation request and the transmission context request is a request to create a PDP context for communication between a mobile subscriber unit and a selected gateway packet radio support node.

19. A system according to claim 17, wherein the system is configured to control an access of users to a Point-to-Multipoint user group.

20. An access point selection method for a serving support node in a mobile communications system, comprising steps of receiving an access request from a mobile subscriber unit of a mobile subscriber over an air interface, said access request including at least indication of a protocol type required by the mobile subscriber unit, selecting at said serving support node an access point to an external system on the grounds of the subscription data of the mobile subscriber or on the grounds of an access point data possibly given in said access request or on other grounds, said step of selecting further comprising checking whether a dynamic address is allowed according to the mobile subscriber data and whether there are one access point address or several access point addresses defined in the mobile subscriber data for the requested protocol type, selecting, in response to that, a dynamic address is not allowed according to the mobile subscriber data and only one access point address is defined in the mobile subscriber data for the requested protocol type, said only access point address defined in the mobile subscriber data, rejecting the access request in response to that a dynamic address is not allowed according to the mobile subscriber data and there are more than one access point address defined in the mobile subscriber data for the requested protocol type.

21. An access point selection method for a serving support node in a mobile communications system, comprising steps of receiving an access request from a mobile subscriber unit of a mobile subscriber over an air interface, said access request including at least indication of a protocol type required by the mobile subscriber unit, selecting at said serving support node an access point to an external system on the grounds of the subscription data of the mobile subscriber or on the grounds of an access point data possibly given in said access request or on other grounds, said step of selecting comprising selecting an access point defined for the requested protocol type in the mobile subscriber data always when a dynamic address is allowed and a visited public land mobile address is not allowed according to the subscription data of the mobile subscriber.

22. An access point selection method for a serving support node in a mobile communications system, comprising steps of receiving an access request from a mobile subscriber unit of a mobile subscriber over an air interface, said access request including at least indication of a protocol type required by the mobile subscriber unit, selecting at said serving support node an access point to an external system on grounds of the subscription data of the mobile subscriber or on grounds of an access point data possibly given in said access request or on other grounds, said step of selecting comprises further steps of checking, in response to a dynamic address being requested by the mobile subscriber station and the serving support node using an access point defined in the mobile subscription data, whether there is only a single access point defined for the requested protocol or none or many access points defined for the requested protocol in the mobile subscription data, carrying out one of following steps in response to said step of checking:

a) if there is only one access point defined for the requested protocol type, selecting said only one access point, b) if there are many access points defined for the requested protocol type, selecting one of said many access points, c) if there is no access point defined for the requested protocol type, rejecting said access request.

* * * * *